C. E. WEIDAW & W. R. OWENS.
ROD CONNECTION FOR LOCOMOTIVES.
APPLICATION FILED MAY 27, 1916.
1,210,120. Patented Dec. 26, 1916.
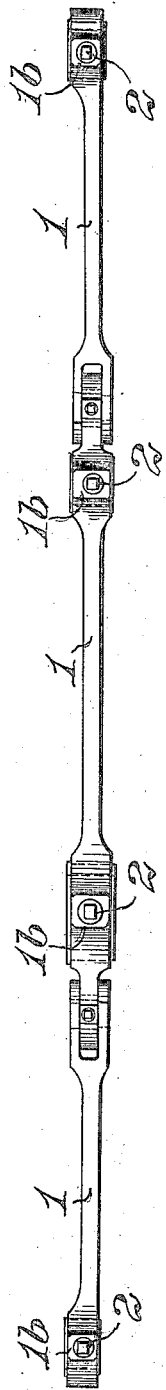
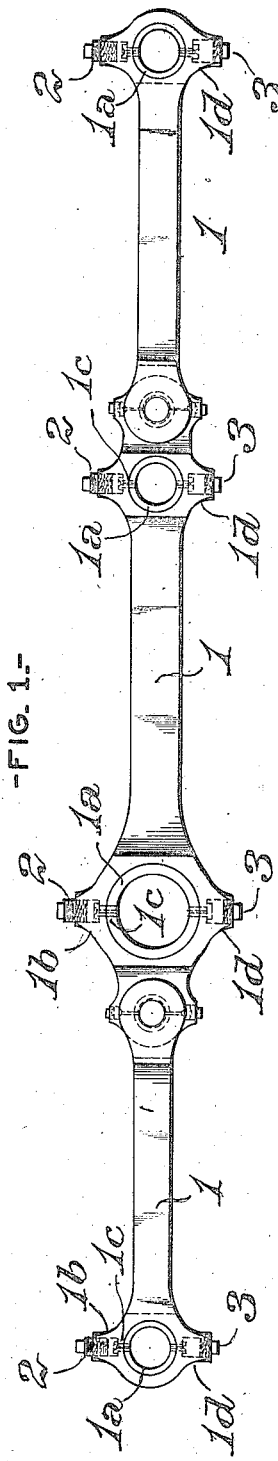
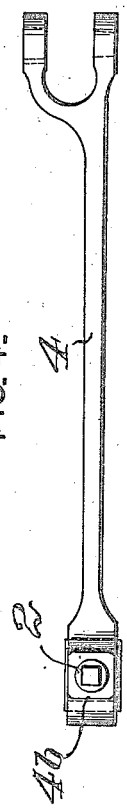
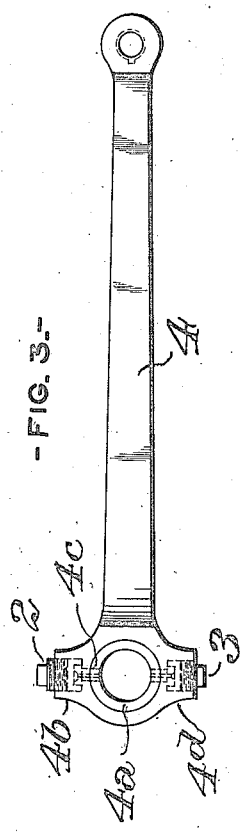

UNITED STATES PATENT OFFICE.

CHARLES E. WEIDAW AND WILLIAM R. OWENS, OF SCRANTON, PENNSYLVANIA, ASSIGNORS OF ONE-THIRD TO HERBERT R. JONES, OF SCRANTON, PENNSYLVANIA.

ROD CONNECTION FOR LOCOMOTIVES.

1,210,120.  Specification of Letters Patent.  Patented Dec. 26, 1916.

Application filed May 27, 1916. Serial No. 100,315.

*To all whom it may concern:*

Be it known that we, CHARLES E. WEIDAW and WILLIAM R. OWENS, both of Scranton, in the county of Lackawanna and State of Pennsylvania, have jointly invented a certain new and useful Improvement in Rod Connections for Locomotives, of which improvement the following is a specification.

The object of our invention is to provide simple and inexpensive means whereby connecting rod members of any of the several forms which are applied in locomotive engines, *i. e.*, side or coupling rods, eccentric rods, combination link rods for Walschaert valve gears, etc., may be rendered interchangeable from the right hand to the left hand side of the locomotive, and vice versa, thereby facilitating and economizing repair work, by the resultant reduction of the supply of rods required to be carried in stock.

The improvement claimed is hereinafter fully set forth.

In the accompanying drawings: Figure 1 is a side view, in elevation of a set of coupling or side connecting rods for a locomotive having four pairs of driving wheels, illustrating an application of our invention; Fig. 2, a plan or top view of the same; Fig. 3, a side view of an eccentric rod to which our invention is applied; and, Fig. 4, a plan or top view of the same.

The various forms of connecting rods for application to which our invention is designed, are used for the purpose of articulating a cylindrical member, as a crank pin fixed on a driving wheel or axle of a locomotive, to a member of similar form, fixed upon another element of the locomotive, these rods having eyes in their ends which fit on the connected cylindrical members, which, in the normal and effective operation of the locomotive, require proper lubrication. For this purpose, the rods are, in ordinary approved practice, provided, at their ends, with oil or grease cups, or plugs, from which a supply of lubricant is fed to the cylindrical members around which their ends are fitted. To enable the lubricant cups to be securely connected to the rods, bosses are forged on the tops of the latter, into which bosses the cups are screwed, and through which, and through the adjoining portions of the rod, passages are formed for the delivery of lubricant to the inner bearings. It will be seen that unless the connecting rods are absolutely symmetrical on opposite sides of their middle vertical planes, and bored for cylindrical pins, which is not, in many instances, practicable, they must be specially designed for, and will be limited to, application on either the right or the left side of the locomotive, as the case may be, and therefore, if spare rods are carried in stock, right and left hand members or sets must be provided to meet all possible conditions of renewal or repair. Our invention, by rendering the rods interchangeable from one to the other side of the locomotive, correspondingly reduces the number which it is necessary to carry in stock in order to promptly meet the requirements of repair work.

Referring first to Figs. 1 and 2, our invention is shown as applied to each of the members of a set of side rods for a locomotive engine having four pairs of driving wheels. Each of the side rods, 1, has, as is ordinary practice, an eye or cylindrical opening adjacent to one of its ends, the portion of the body of the rod surrounding the eye being expanded into cylindrical form to be fitted on a crank pin on one of the driving wheels, a bushing, 1ª, of suitable metal, being usually interposed, and an eye on its correspondingly expanded opposite end, which is either fitted on a crank pin on another driving wheel or on a knuckle pin by which the rod is coupled to one end of the adjacent rod, the latter having two crank pin eyes intermediate of those for the knuckle pins, each intermediate eye being fitted on a driving wheel crank pin. A boss or circumferential projection, 1ᵇ, is, as in ordinary practice, forged substantially in line radially with each of the eyes of the side rods, each of said bosses being tapped to receive the threaded end of a lubricant plug or cup, 2, and having a passage, 1ᶜ, for lubricant, extending through it, which passage is continued, through the end of the rod and the bushing, 1ª.

In the practice of our invention, a boss, 1ᵈ, corresponding in form and dimensions to the ordinary boss, 1ᵇ, above described, which is internally threaded by a tap similar to that by which the thread of the boss 1ᵇ, is cut, and perforated by an oil passage, is forged on each of the rods, on the side thereof posite to the ordinary boss, and ordinarily diametrically opposite thereto, the oil passage in said boss being closed, when in service, by a screw threaded cap plug, 3, engaging the thread of the rod. Under this construction, the rods may be applied to either side of the locomotive, as desired, and will be interchangeable from one side to the other, it being only necessary, in the latter case, to turn them over, remove the lubricant cups from their former positions and insert them in the threaded openings in the then upper sides of the rods, and close the openings from which the lubricant cups have been removed, by the screw plugs.

Figs. 3 and 4 illustrate our invention as similarly embodied in an eccentric rod, 4, for a Walschaert valve gear, one end of which is, as in ordinary practice, expanded to receive a bushing, $4^a$, which fits on a return crank pin secured in a locomotive driving wheel, and the other end of which is forked for connection to a link block or die. A boss or circumferential projection, $4^b$, and oil passage, $4^c$, are formed on and in the end of the eccentric rod, which receives the crank pin, these corresponding in function with the similar elements of the side rods before described. In the application of our invention, we forge a boss, $4^d$, on the crank pin end of the eccentric rod, diametrically opposite the ordinary boss, $4^b$, and provide a cap plug, 3, which engages a thread in said boss, of the same tap as that which is cut in the boss, $4^b$, for the engagement of the lubricant plug, 2. The eccentric rod is applicable on either side of the locomotive, and is interchangeable from one side to the other, in the same manner as the side connecting rods before described.

We claim as our invention and desire to secure by Letters Patent:

A rod connection member for locomotives, of symmetrical form on either side of a central horizontal plane and having an eye at its end for the reception of a crank pin, diametrically opposite, bored and threaded bosses on said end, the upper of which in use receives a lubricating cup and the lower of which in use is closed by a cap or plug.

CHARLES E. WEIDAW.
WILLIAM R. OWENS.

Witnesses:
SAMUEL S. RIEGEL,
JOSEPH J. DONAHOE.